J. C. ROHRMAN.

WATER-PIPE.

No. 6,834. Reissued Jan. 4, 1876.

WITNESSES

Robert Everett

E. F. Bates

INVENTOR

John C. Rohrman,

Chipman & Fosnot & Co.

ATTORNEYS

UNITED STATES PATENT OFFICE.

JOHN C. ROHRMAN, OF PHILADELPHIA, PENNSYLVANIA.

IMPROVEMENT IN WATER-PIPES.

Specification forming part of Letters Patent No. 71,222, dated November 19, 1867; reissue No. 6,834, dated January 4, 1876; application filed December 18, 1875.

*To all whom it may concern:*

Be it known that I, JOHN C. ROHRMAN, of Philadelphia, county of Philadelphia and State of Pennsylvania, have invented an Improvement in Waste-Water Pipes; and do hereby declare the following to be a full, clear, and exact description of the same.

My invention relates to the construction of the pipes used for conveying rain water from the gutters of buildings to the ground; and it consists in the novel formation of the pipe with a longitudinal recess or re-entrant groove, made, substantially as described hereinafter, so that the said pipe may be at liberty to expand and contract to a limited degree during frosty weather, and so that the joint may be in the best condition for resisting the strain consequent upon such expansion and contraction.

In order to enable others skilled in the art to make this pipe, I will now describe the mode of constructing the same, reference being had to the accompanying drawing, which forms a part of this specification, and in which—

Figure 1:
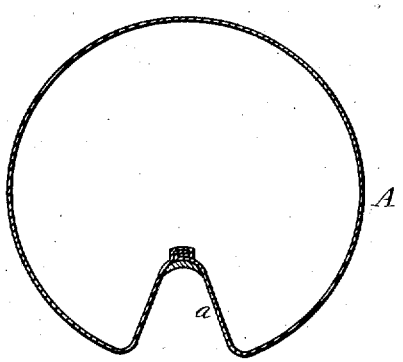
Figure 2:
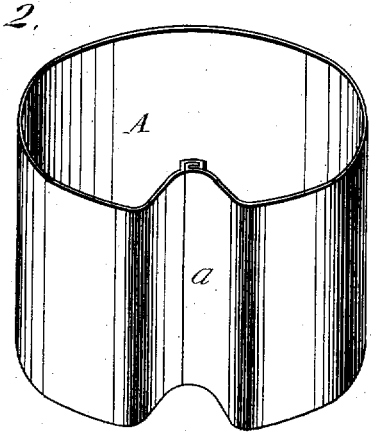
Figure 3:
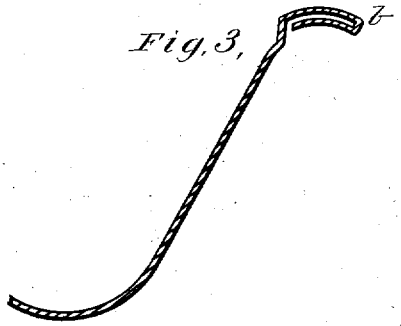
Figure 4:
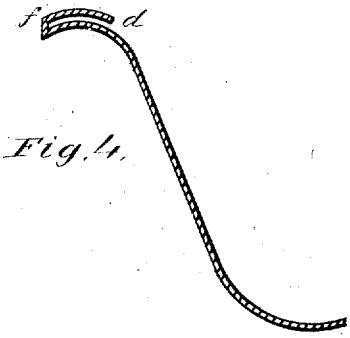
Figure 5:
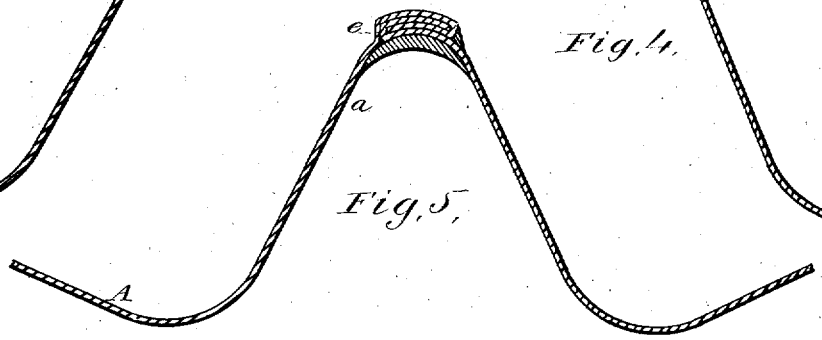

Figure 1 represents a transverse section of my improved pipe. Fig. 2 is a perspective view of a portion of the pipe. Figs. 3 and 4 are enlarged views of constructive details in section. Fig. 5 is an enlarged sectional view, showing the joint.

Similar letters refer to similar parts throughout the several views.

The pipe A is made of the ordinary material, usually tinned plate or plate zinc being employed; but instead of being entirely cylindrical, as in the usual form, it is bent to form a continuous longitudinal recess or groove, *a*, from end to end, as shown in the drawings.

This recess or groove, as illustrated, is formed in the following manner: The plate of which the pipe is made is first bent to a cylindrical form, and then a portion near one edge is bent inward, as represented at *b*, a portion near the opposite edge being also bent inward, as shown at *d*. These edges may be again reversely bent to lap or interlock at the joint, as shown at *e* and *f*, if desirable. The edges are securely soldered together, and the pipe is complete. Owing to the groove *a* the pipe possesses the property of expanding and contracting to a limited extent without being split or fractured, an advantage not possessed by ordinary cylindrical pipes, which, owing to the freezing of the water in the interior during the winter months, are apt to be distended to an extent which causes rupture.

What I claim as new, and desire to secure by Letters Patent, is—

1. A waste-water pipe, having a longitudinal recess or re-entrant groove, *a*, extending in continuous form from end to end, capable of yielding to prevent rupture, substantially as specified.

2. A waste-water pipe, having a longitudinal recess or groove, *a*, made substantially as described, by bending, lapping, and soldering the edges, substantially as specified.

In testimony that I claim the above I have hereunto subscribed my name in the presence of two witnesses.

JOHN C. ROHRMAN.

Witnesses:
HARRY ROHRMAN,
J. H. ACKROYD.